United States Patent Office 2,767,996
Patented Oct. 23, 1956

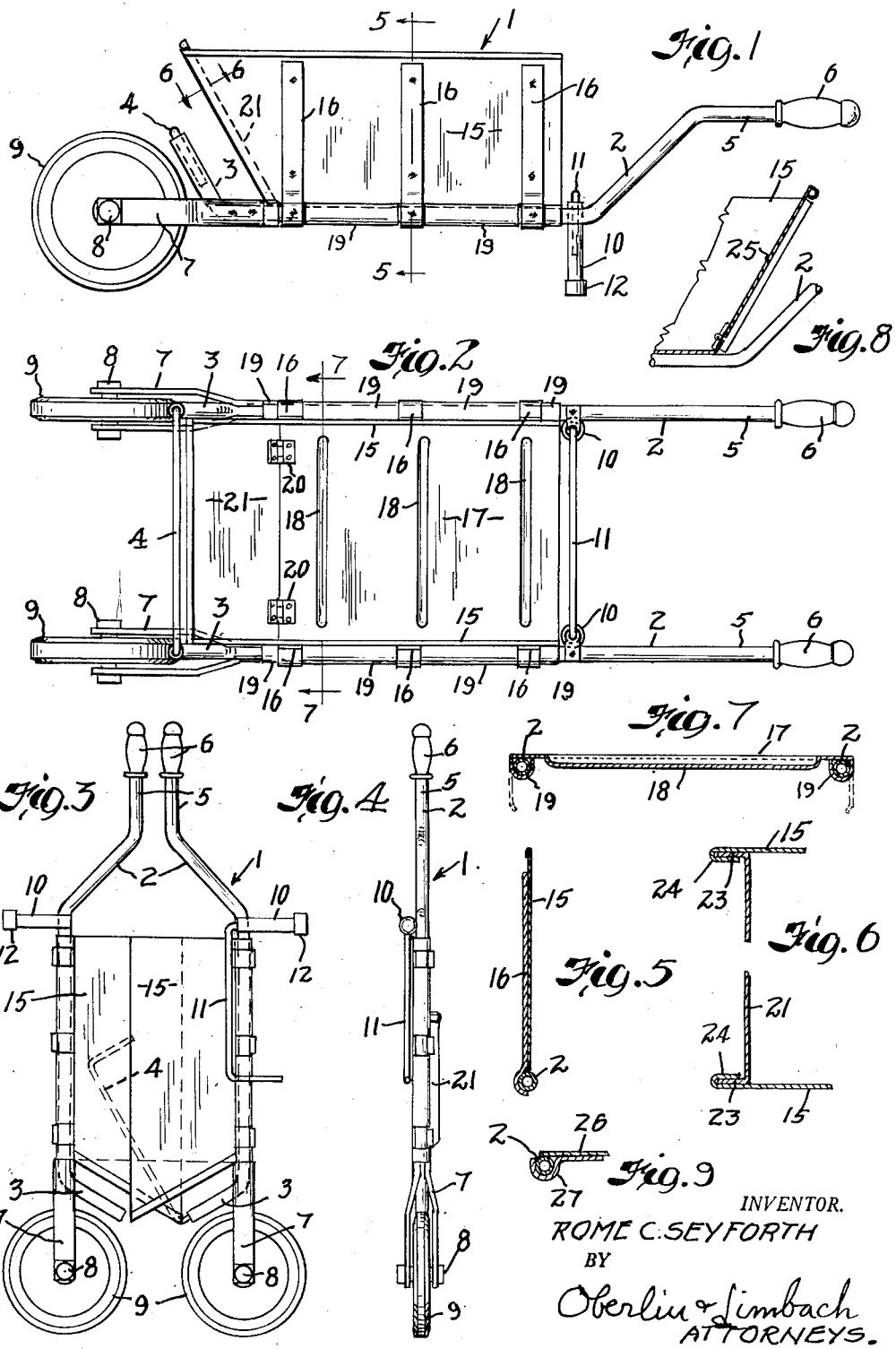

2,767,996

COLLAPSIBLE LAWN CART

Rome C. Seyforth, Shelby, Ohio

Application July 25, 1955, Serial No. 524,112

16 Claims. (Cl. 280—40)

The present invention relates generally as indicated to a collapsible lawn cart, and more particularly to a two-wheel lawn cart which is adapted to be collapsed or folded, without use of tools, to flat condition for ease of storage in a small space.

The two-wheel lawn carts which are now in wide usage by many home owners are not foldable or collapsible and therefore aggravate the storage problem. Garages are usually fully occupied by the automobile, lawn mower, bicycle, tricycle, wagon, gardening tools, lawn roller, wheel barrow, etc., so as to leave but very little, if any, space for the lawn cart.

Accordingly, it is a principal object of this invention to provide a collapsible lawn cart which, when collapsed, occupies very little floor space and may easily be hung on the garage wall or elsewhere.

It is another object of this invention to provide a collapsible lawn cart which, in its uncollapsed condition, is of sturdy rigid construction arranged for carrying heavy loads and for rough handling.

It is another object of this invention to provide a two-wheel and two-leg supported lawn cart which provides a sturdy four-point support against tipping of the cart.

It is another object of this invention to provide a collapsible lawn cart in which the cart body or receptacle has a bottom with respect to which the opposite sides and front end (or both front and back ends) are hinged for swinging of said sides and front end (or both the front and rear ends) to planes generally parallel to and flat against the bottom.

It is another object of this invention to provide a collapsible lawn cart of the character indicated in which the handles thereof are rotatable with respect to the bottom and mount the respective wheels, sides, and supporting legs in a common plane for swinging to collapsed condition of the cart.

It is another object of this invention to provide a collapsible lawn cart of the character indicated in which the hinged end (or ends) is detachably interlocked with the opposite sides of the cart body to thus securely hold the sides and end (or ends) in predetermined upstanding relation with respect to the bottom of the cart body.

It is another object of this invention to provide a collapsible lawn cart which has a removable cross-brace for the purpose of resisting twisting of the cart frame due to uneven lifting force exerted on the handles thereof or due to unbalanced load in the cart body.

It is another object of this invention to provide a collapsible lawn cart of the character indicated which, in its uncollapsed condition, is cross-braced in front of and behind the cart body to impart rigidity to the cart body and frame thereof.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevation view of the present cart in its uncollapsed condition;

Fig. 2 is a top plan view of the Fig. 1 lawn cart;

Fig. 3 is a front elevation view of the cart in its collapsed condition with the sides and front of the cart body, the wheels, the supporting legs, and the handles disposed in substantially co-planar relation;

Fig. 4 is an end elevation view of the collapsed lawn cart as viewed from the righthand side of Fig. 3;

Figs. 5, 6, and 7 are detail cross-section views of the lawn cart taken substantially along the lines 5—5, 6—6 (Fig. 1), and 7—7 (Fig. 2), respectively;

Fig. 8 is a fragmentary vertical cross-section view of a modified form of cart in which the rear end wall of the cart body is also hinged to the bottom for swinging down to a plane parallel to the bottom; and Fig. 9 is a fragmentary cross-section view showing a different manner of providing hinge knuckles on the cart bottom.

Referring now more specifically to the drawings, the lawn cart 1 herein comprises a pair of longitudinally extending handles 2 preferably made of tubing so as to be lightweight, but yet strong, and also so as to provide a convenient means of cross-bracing as hereinafter explained.

The front ends 3 of said handles 2 are bent upwardly for telescopic engagement with the downwardly extending legs of a cross-brace 4. The rear ends of said handles 2 are upwardly offset as shown in planes parallel to the respective front ends 3 thereof to provide convenient cart-lifting portions 5 which may, if desired, be equipped with rubber or plastic hand grips 6.

Extending forwardly from the front ends of the handles 2 are forks 7 (welded or otherwise secured to the handles 2) mounting the axles 8 upon which wheels 9 are journalled.

The handles 2 are also provided with downwardly extending legs 10 which may be welded or otherwise secured to the respective handles, said legs preferably being tubular to telescopically receive the downwardly extending legs of a rear cross-brace 11. If desired, the lower ends of said legs 10 may be closed as by means of caps 12 pressed thereover or otherwise mounted in place.

The respective handles 2 also have mounted thereon the opposite sides 15 of the cart body with the sides disposed in the same planes as the respective wheels 9, front brace-receiving portions 3, legs 10, and offset cart-lifting portions 5 so that rotation of the handles 2 will rotate said elements to any desired plane. The opposite sides 15 of the cart body may comprise flat pieces of sheet metal rolled over or folded along the top edge for strength and for eliminating sharp edges and may be secured to the handles 2 as by means of heavy strip supports 16 contoured at their lower ends to embrace the respective handles 2 as best shown in Fig. 5. Said supports 16 are preferably welded to the respective handles 2 in longitudinally spaced apart relation between the wheels 9 and the legs 10 and, in turn, the sides 15 are welded or otherwise secured to the supports 16.

The bottom 17 of the cart body, suitably reinforced by the ribs 18 formed therein, is formed with hinge knuckles 19 which straddle supports 16 and which are adapted to be wrapped around the respective handles 2 from the dotted line positions as is best shown in Fig. 7.

In the form of the invention illustrated in Figs. 1–7, the front edge of said bottom 17 has hinged thereto, as by means of the hinges 20, a front end 21. The top edge of said front end 21 is rolled over to form a bead to impart strength thereto even though made from relatively thin sheet metal and the opposite sides of said front end are formed with flanges 23 as best shown in Fig. 6, which flanges fit into and interlock with the inturned and rearwardly extending flanges 24 along the front edges of the respective sides 15.

If desired, and as shown in Fig. 8, the rear edge of said bottom 17 may have hinged thereto a rear end 25 of the same construction as the front end 21 for interlocking with the sides 15 of the cart body.

It can now be seen that, by reason of the rotatable mounting of the handles 2 through the hinge knuckles 19 of the bottom 17, when the front end 21 is swung (clockwise in Fig. 1) so as to lie on top of the bottom 17 and with the cross-braces 4 and 11 removed, said handles 2 may be swung around 270° to position the opposite sides 15 underneath the bottom 17 in a plane substantially parallel to said bottom. Such swinging of the handles 2 also rotates the wheels 9, the front brace-receiving portions 3 of the handles, and the legs 10 to the same plane as the sides 15, whereby the cart, when thus collapsed, is quite flat, the maximum thickness dimension being the length of the axles 8 of the respective wheels 9 and the maximum lateral dimension being the space between the handles 2 plus the sum of the radii of the two wheels, 9, 9 or plus the sum of the lengths of the two supporting legs, 10, 10 which, in this case, may be the same as the radii of the wheels so as to support the bottom 17 of the cart in generally horizontal position.

When the cart is in collapsed position as shown in Figs. 3 and 4, it may be hung on a garage wall as on nails or hooks which engage, for example, under the outwardly extending legs 10.

In the collapsed condition of the present lawn cart, the cross-braces 4 and 11 may be inserted as shown.

As can be seen from the foregoing description, it is a quick and easy matter to uncollapse the lawn cart simply by swinging the handles 2 around to position the sides 15 in parallel relation upstanding with respect to the bottom 17, then swinging the front end 21 to interlock its flanges 23 with the flanges 24 of the sides 15, and finally inserting the cross-braces 4 and 11 in telescoping relation with respect to the end portions 3 of the handles forwardly of the cart body and to the legs 10 rearwardly of the cart body. As evident, these cross-braces 4 and 11 serve to keep the wheels 9 and the handles 2 in parallel planes to prevent twisting of the cart bottom 17 and the cart body.

A further feature of the present invention is the offsetting of the rear end portions 5 of the handles 2 with respect to the wheel and bottom supporting portions, whereby the load in the cart body is effectively cradled between the wheels and said portions 5.

The distance between the handles 2 and the diameters of the wheels 9 are such that, in the folded condition, the wheels may be turned to lie in a common plane as in Figs. 3 and 4; and, of course, the axles 8 of said wheels are spaced sufficiently forward of the cart bottom 17 so that the sides 15 and wheels 9 may be swung to substantially co-planar relation relative to the bottom.

A preferred manner of manufacturing this lawn cart is to first complete all of the handle assembly operations, that is, to mount the forks 7 thereon, mount the axles 8 and the wheels 9 therein, attach the legs 10, and attach the sides 15 all in one plane. Then the bottom 17 and front end 21 are hingedly connected together and also the rear end 25, if such is provided, whereupon the knuckle-forming portions 19 which are preferably in the dotted line position of Fig. 7 with crimped ends, are inserted between the side supports 16 and underneath the bottom edges of the sides 15 whereupon the knuckles 19 may be formed by wrapping the projecting ends of the bottom 17 around the respective handles 2.

It is to be understood that the hinge knuckles 19 need not be integral with the bottom 17 but, instead, may be formed as in Fig. 9, that is, by securing to the bottom 26 the pieces 27 which serve to hingedly embrace the handles 2. The pieces 27 may extend all the way across the bottom to reinforce the same and be formed with handle-encircling portions at the opposite ends thereof.

Other modes of applying the principle of the invention may be employed, change being made as regards the details described, provided the features stated in any of the following claims, or the equivalent of such, be employed.

I therefore particularly point out and distinctly claim as my invention:

1. A collapsible lawn cart comprising a pair of longitudinally extending handles each having a ground-engaging wheel at its front end and a longitudinally extending cart side disposed in substantially the same plane as said wheel, a cart bottom and front hinged together for swinging of the latter from upwardly extending positions to a plane generally parallel to said bottom, said handles being hinged to opposite edge portions of said bottom whereby, upon rotation of said handles, said wheels and opposite sides may be swung to planes generally parallel to said bottom, said front, in its upwardly extending position, being releasably interfitted with said opposite sides to hold the latter in positions extending upwardly from opposite edge portions of said bottom and whereat said wheels are in cart-supporting position.

2. A collapsible lawn cart comprising a pair of longitudinally extending handles each having a ground-engaging wheel at its front end and a longitudinally extending cart side disposed in substantially the same plane as said wheel, a cart bottom and front hinged together for swinging of the latter from upwardly extending position to a plane generally parallel to said bottom, said handles being hinged to opposite edge portions of said bottom whereby, upon rotation of said handles, said wheels and opposite sides may be swung to planes generally parallel to said bottom, said front, in its upwardly extending position, being releasably interfitted with said opposite sides to hold the latter in positions extending upwardly from opposite edge portions of said bottom and whereat said wheels are in cart-supporting position, said handles being formed with upwardly extending portions between said wheels and cart front, and a cross brace having downwardly extending legs removably, telescopically engaged with said upwardly extending portions.

3. A collapsible lawn cart comprising a pair of longitudinally extending handles each having a ground-engaging wheel at its front end and a longitudinally extending cart side disposed in substantially the same plane as said wheel, a cart bottom and front hinged together for swinging of the latter from upwardly extending posion to a plane generally parallel to said bottom, said handles being hinged to opposite edge portions of said bottom whereby, upon rotation of said handles, said wheels and opposite sides may be swung to planes generally parallel to said bottom, said front, in its upwardly extending position, being releasably interfitted with said opposite sides to hold the latter in positions extending upwardly from opposite edge portions of said bottom and whereat said wheels are in cart-supporting position, said handles, rearward of said cart bottom, having downwardly extending ground-engaging legs, and a cross brace having downwardly extending legs removably telescopically engaged with said ground-engaging legs.

4. A collapsible lawn cart comprising a pair of longitudinally extending handles each having a ground-engaging wheel at its front end and a longitudinally extending cart side disposed in substantially the same plane as said wheel, a cart bottom and front hinged together for swinging of the latter from upwardly extending position to a plane generally parallel to said bottom, said handles being hinged to opposite edge portions of said bottom whereby, upon rotation of said handles, said wheels and opposite sides may be swung to planes generally parallel to said bottom, said front, in its upwardly extending position, being releasably interfitted with said opposite sides to hold the latter in positions extending upwardly from opposite edge portions of said bottom and whereat said wheels are in cart-supporting position, said handles being formed with upwardly extending portions between said wheels and cart front and with downwardly extending ground-engaging legs rearward of said cart bottom, and a pair of removable cross braces having downwardly extending legs telescopically engaged with the respective upwardly extending portions and ground-engaging legs.

5. A collapsible lawn cart comprising a cart bottom formed with hinge knuckles along opposite side edges thereof, a front hinged to the front end of said bottom, a pair of handles rotatably extending through said hinge knuckles and having forked front ends, wheels mounted in such forked front ends of said handles, opposite cart sides rigidly connected to said handles in substantially the same planes as the respective wheels, and releasable means holding said front and sides in positions extending upwardly from said bottom to define a receptacle, said front, sides, and wheels being swingable, when said means is released, to positions lying in planes generally parallel to said bottom.

6. A collapsible lawn cart comprising a cart bottom formed with hinge knuckles along opposite side edges thereof, a front hinged to the front end of said bottom, a pair of handles rotatably extending through said hinge knuckles and having forked front ends, wheels mounted in such forked front ends of said handles, opposite cart sides rigidly connected to said handles in substantially the same planes as the respective wheels, and releasable means holding said front and sides in positions extending upwardly from said bottom to define a receptacle, said front, sides, and wheels being swingable, when said means is released, to positions lying in planes generally parallel to said bottom, said handles being formed with rear hand grip portions upwardly offset with respect to said bottom in substantially the same planes as the respective wheels and sides.

7. A collapsible lawn cart comprising a cart bottom formed with hinge knuckles along opposite side edges thereof, a front hinged to the front end of said bottom, a pair of handles rotatably extending through said hinge knuckles and having forked front ends, wheels mounted in such forked front ends of said handles, opposite cart sides rigidly connected to said handles in substantially the same planes as the respective wheels, and releasable means holding said front and sides in positions extending upwardly from said bottom to define a receptacle, said front, sides, and wheels being swingable, when said means is released, to positions lying in planes generally parallel to said bottom, said releasable means comprising interlocking flanges formed on the sides of said front and on the front edges of said sides.

8. A collapsible lawn cart comprising a cart bottom formed with hinge knuckles along opposite side edges thereof, a front hinged to the front end of said bottom, a pair of handles rotatably extending through said hinge knuckles and having forked front ends, wheels mounted in such forked front ends of said handles, opposite cart sides rigidly connected to said handles in substantially the same planes as the respective wheels, and releasable means holding said front and sides in positions extending upwardly from said bottom to define a receptacle, said front, sides, and wheels being swingable, when said means is released, to positions lying in planes generally parallel to said bottom, said releasable means comprising interlocking flanges formed on the sides of said front and on the front edges of said sides, and a cross-brace releasably telescopically engaged with said handles between said wheels and the front end of said bottom.

9. A collapsible lawn cart comprising a cart bottom formed with hinge knuckles along opposite side edges thereof, a front hinged to the front end of said bottom, a pair of handles rotatably extending through said hinge knuckles and having forked front ends, wheels mounted in such forked front ends of said handles, opposite cart sides rigidly connected to said handles in substantially the same planes as the respective wheels, and releasable means holding said front and sides in positions extending upwardly from said bottom to define a receptacle, said front, sides, and wheels being swingable, when said means is released, to positions lying in planes generally parallel to said bottom, said releasable means comprising interlocking flanges formed on the sides of said front and on the front edges of said sides, and a cross-brace releasably telescopically engaged with said handles rearward of said bottom.

10. A collapsible lawn cart comprising a cart bottom formed with hinge knuckles along opposite side edges thereof, a front hinged to the front end of said bottom, a pair of handles rotatably extending through said hinge knuckles and having forked front ends, wheels mounted in such forked front ends of said handles, opposite cart sides rigidly connected to said handles in substantially the same planes as the respective wheels, and releasable means holding said front and sides in positions extending upwardly from said bottom to define a receptacle, said front, sides, and wheels being swingable, when said means is released, to positions lying in planes generally parallel to said bottom, said releasable means comprising interlocking flanges formed on the sides of said front and on the front edges of said sides, and a pair of cross-braces releasably telescopically engaged with said handles forward and rearward of said bottom.

11. A collapsible lawn cart comprising a cart bottom formed with hinge knuckles along opposite side edges thereof, a front and a rear hinged to the respective ends of said bottom, a pair of handles extending through said hinge knuckles and having forked front ends, wheels mounted in such forked front ends of said handles, opposite cart sides rigidly connected to said handles in substantially the same planes as the respective wheels, and releasable means holding said front, rear, and sides in positions extending upwardly from said bottom to define a receptacle, said front, rear, sides, and wheels being swingable, when said means is released, to positions lying in planes generally parallel to said bottom.

12. A collapsible lawn cart comprising a cart body including a bottom, an upstanding front end, and upstanding sides; said front end being hinged to said bottom for swinging down substantially flat against the upper surface of said bottom, longitudinally extending handles hinged to opposite side edges of said bottom and to which the lower edges of said sides are rigidly connected for swinging to positions underneath said bottom and in planes substantially parallel to said bottom responsive to rotation of said handles, a ground-engaging wheel on each handle, said wheels and respective sides being in substantially the same planes whereby said wheels will be substantially co-planar and generally parallel to said bottom when said sides are swung as aforesaid; and releasable means holding said cart in uncollapsed condition with said wheels in vertical planes and with said front end and sides extending upwardly from said bottom.

13. A collapsible lawn cart comprising a cart body including a bottom, an upstanding front end, and upstanding sides; said front end being hinged to said bottom for swinging down substantially flat against the upper surface of said bottom, longitudinally extending handles hinged to opposite side edges of said bottom and to which the lower edges of said sides are rigidly connected for swinging to positions underneath said bottom and in planes substantially parallel to said bottom responsive to rotation of said handles, a ground-engaging wheel on each handle, said wheels and respective sides being in substantially the same planes whereby said wheels will be substantially co-planar and generally parallel to said bottom when said sides are swung as aforesaid; and releasable means holding said cart in uncollapsed condition with said wheels in vertical planes and with said front end and sides extending upwardly from said bottom, said releasable means comprising a front cross-brace releasably engaging said handles forwardly of said front and effective to frictionally clamp said front end between said sides.

14. A collapsible lawn cart comprising a cart body including a bottom, an upstanding front end, and upstanding sides; said front end being hinged to said bottom for swinging down substantially flat against the upper surface of said bottom, longitudinally extending handles hinged to opposite side edges of said bottom and to which the lower edges of said sides are rigidly connected for swinging to positions underneath said bottom and in planes substantially parallel to said bottom responsive to rotation of said handles, a ground-engaging wheel on each handle, said wheels and respective sides being in substantially the same planes whereby said wheels will be substantially co-planar and generally parallel to said bottom when said sides are swung as aforesaid; and releasable means holding said cart in uncollapsed condition with said wheels in vertical planes and with said front end and sides extending upwardly from said bottom, said releasable means comprising a front cross-brace releasably engaging said handles forwardly of said front and effective to frictionally clamp said front end between said sides, and a rear cross-brace releasably engaging said handles rearward of said bottom and effective to resist twisting of said bottom by imposition of unequal lifting forces on said handles.

15. A collapsible lawn cart comprising a cart body including a bottom, an upstanding front end, and upstanding sides; said front end being hinged to said bottom for swinging down substantially flat against the upper surface of said bottom, longitudinally extending handles hinged to opposite side edges of said bottom and to which the lower edges of said sides are rigidly connected for swinging to positions underneath said bottom and in planes substantially parallel to said bottom responsive to rotation of said handles, a ground-engaging wheel on each handle, said wheels and respective sides being in substantially the same planes whereby said wheels will be substantially co-planar and generally parallel to said bottom when said sides are swung as aforesaid; and releasable means holding said cart in uncollapsed condition with said wheels in vertical planes and with said front end and sides extending upwardly from said bottom; said front end and sides being formed with interfitting portions which constitute a stop for the upwardly extending position of said front end and which are effective to hold said sides against swinging movement relative to said bottom.

16. A collapsible lawn cart comprising a cart body including a bottom, an upstanding front end, and upstanding sides; said front end being hinged to said bottom for swinging down substantially flat against the upper surface of said bottom, longitudinally extending handles hinged to opposite side edges of said bottom and to which the lower edges of said sides are rigidly connected for swinging to positions underneath said bottom and in planes substantially parallel to said bottom responsive to rotation of said handles, a ground-engaging wheel on each handle, said wheels and respective sides being in substantially the same planes whereby said wheels will be substantially co-planar and generally parallel to said bottom when said sides are swung as aforesaid; and releasable means holding said cart in uncollapsible condition with said wheels in vertical planes and with said front end and sides extending upwardly from said bottom; said front end and sides being formed with interfitting portions which constitute a stop for the upwardly extending position of said front end and which are effective to hold said sides against swinging movement relative to said bottom; and a rear cross-brace releasably engaging said handles rearward of said bottom and effective to resist twisting of said bottom by imposition of unequal lifting forces on said handles.

References Cited in the file of this patent

UNITED STATES PATENTS

| 1,475,785 | Bergstrom | Nov. 27, 1923 |
| 1,631,333 | Privat | June 7, 1927 |
| 2,657,069 | Quist | Oct. 27, 1953 |